(12) United States Patent
Rodgers et al.

(10) Patent No.: US 7,706,744 B2
(45) Date of Patent: Apr. 27, 2010

(54) WIRELESS REPEATER IMPLEMENTING LOW-LEVEL OSCILLATION DETECTION AND PROTECTION FOR A DUPLEX COMMUNICATION SYSTEM

(75) Inventors: Michael W. Rodgers, Atlanta, GA (US); Stephen W. Kim, Alpharetta, GA (US)

(73) Assignee: Wireless Extenders, Inc., Atlanta, GA (US)

( * ) Notice: Subject to any disclaimer, the term of this patent is extended or adjusted under 35 U.S.C. 154(b) by 870 days.

(21) Appl. No.: 11/138,010

(22) Filed: May 26, 2005

(65) Prior Publication Data

US 2005/0272367 A1 Dec. 8, 2005

Related U.S. Application Data

(60) Provisional application No. 60/574,428, filed on May 26, 2004.

(51) Int. Cl.
 *H04B 7/15* (2006.01)
(52) U.S. Cl. .................. 455/11.1; 455/12.1; 455/13.1
(58) Field of Classification Search .......... 455/11.1
 See application file for complete search history.

(56) References Cited

U.S. PATENT DOCUMENTS

| | | | |
|---|---|---|---|
| 2,258,586 A | | 10/1941 | Glassing et al. |
| 4,549,293 A | * | 10/1985 | Christian et al. ............ 370/347 |
| 4,677,687 A | | 6/1987 | Matsuo |
| 4,704,733 A | | 11/1987 | Kawano |
| 4,754,495 A | | 6/1988 | Kawano |
| 4,849,963 A | | 7/1989 | Kawano |
| 4,941,200 A | | 7/1990 | Leslie et al. |
| 5,095,528 A | | 3/1992 | Leslie et al. |
| 5,164,985 A | * | 11/1992 | Nysen et al. ................. 380/271 |
| 5,222,246 A | * | 6/1993 | Wolkstein .................... 455/13.4 |
| 5,574,967 A | * | 11/1996 | Dent et al. .................. 455/12.1 |
| 5,812,933 A | * | 9/1998 | Niki ............................. 455/16 |
| 5,815,795 A | * | 9/1998 | Iwai ............................. 455/9 |
| 5,835,848 A | * | 11/1998 | Bi et al. ....................... 455/24 |
| 5,860,057 A | * | 1/1999 | Ishida et al. ................ 455/12.1 |
| 5,883,884 A | * | 3/1999 | Atkinson .................... 370/279 |
| 5,991,693 A | * | 11/1999 | Zalewski .................... 701/300 |
| 6,009,324 A | | 12/1999 | Pravitz et al. |

(Continued)

FOREIGN PATENT DOCUMENTS

GB      2 258 586 A      2/1993

*Primary Examiner*—Duc Nguyen
*Assistant Examiner*—Hai V Nguyen
(74) *Attorney, Agent, or Firm*—Michael J. Mehrman; Mehrman Law Office, P.C.

(57) ABSTRACT

A modular wireless repeater typically deployed with a roof-mounted tower-signal antenna and a base unit with a base unit antenna located within the building, to which the tower-signal antenna and the base unit are connected by the user or a satellite TV installer using a 75Ω coaxial cable. The system allows a customer to purchase a unit for all wireless service providers in a given frequency band, such as Cellular, PCS, GSM900, or DCS, etc., and then add on modules for additional types of service that the customer may desire in the future. The system also detects and prevents low-level oscillations. The wireless repeater also performs intelligent power control allowing it to function properly with near and far base unit antennas as well as near and far mobile stations.

32 Claims, 11 Drawing Sheets

U.S. PATENT DOCUMENTS

| | | | | |
|---|---|---|---|---|
| 6,023,612 | A * | 2/2000 | Harris et al. | 455/127.1 |
| 6,222,503 | B1 * | 4/2001 | Gietema et al. | 343/890 |
| 6,385,435 | B1 * | 5/2002 | Lee | 455/24 |
| 6,567,645 | B1 * | 5/2003 | Wiedeman et al. | 455/12.1 |
| 6,570,858 | B1 * | 5/2003 | Emmons et al. | 370/321 |
| 6,671,502 | B1 * | 12/2003 | Ogawa | 455/127.1 |
| 6,690,657 | B1 * | 2/2004 | Lau et al. | 370/315 |
| 6,745,003 | B1 | 6/2004 | Maca et al. | |
| 6,768,897 | B1 * | 7/2004 | Suonvieri | 455/15 |
| 6,838,989 | B1 * | 1/2005 | Mays et al. | 340/572.1 |
| 6,889,033 | B2 * | 5/2005 | Bongfeldt | 455/11.1 |
| 6,903,619 | B2 * | 6/2005 | Dennis et al. | 332/112 |
| 6,915,141 | B2 * | 7/2005 | Loke | 455/550.1 |
| 6,985,451 | B1 * | 1/2006 | Nattiv et al. | 370/277 |
| 6,993,287 | B2 * | 1/2006 | O'Neill | 455/11.1 |
| 7,035,587 | B1 * | 4/2006 | Yarkosky | 455/13.4 |
| 7,043,199 | B2 * | 5/2006 | Dai et al. | 455/13.4 |
| 7,088,953 | B2 * | 8/2006 | Bongfeldt | 455/24 |
| 7,233,771 | B2 * | 6/2007 | Proctor et al. | 455/11.1 |
| 7,251,459 | B2 * | 7/2007 | McFarland et al. | 455/101 |
| 7,254,379 | B2 * | 8/2007 | Xu et al. | 455/296 |
| 7,283,840 | B2 * | 10/2007 | Cho | 455/552.1 |
| 7,305,211 | B2 * | 12/2007 | Dent | 455/12.1 |
| 7,430,257 | B1 * | 9/2008 | Shattil | 375/347 |
| 7,555,136 | B2 * | 6/2009 | Wang | 381/380 |
| 7,593,449 | B2 * | 9/2009 | Shattil | 375/130 |
| 7,627,287 | B2 * | 12/2009 | Moss | 455/16 |
| 2001/0038670 | A1 * | 11/2001 | Whight | 375/267 |
| 2002/0028655 | A1 * | 3/2002 | Rosener et al. | 455/16 |
| 2002/0090974 | A1 * | 7/2002 | Hagn | 455/552 |
| 2002/0119749 | A1 * | 8/2002 | Oh et al. | 455/11.1 |
| 2002/0155838 | A1 * | 10/2002 | Durrant et al. | 455/445 |
| 2002/0193108 | A1 * | 12/2002 | Robinett | 455/427 |
| 2003/0104781 | A1 | 6/2003 | Son | 455/22 |
| 2003/0123401 | A1 * | 7/2003 | Dean | 370/318 |
| 2003/0157885 | A1 * | 8/2003 | Lukkarila et al. | 455/11.1 |
| 2003/0232595 | A1 * | 12/2003 | Baker et al. | 455/11.1 |
| 2004/0097189 | A1 | 5/2004 | Bongfeldt et al. | 455/7 |
| 2004/0102219 | A1 * | 5/2004 | Bunton et al. | 455/560 |
| 2004/0110469 | A1 * | 6/2004 | Judd et al. | 455/15 |
| 2004/0146013 | A1 * | 7/2004 | Song et al. | 370/279 |
| 2004/0156097 | A1 * | 8/2004 | Roper et al. | 359/341.41 |
| 2004/0166802 | A1 * | 8/2004 | McKay et al. | 455/15 |
| 2004/0176026 | A1 * | 9/2004 | Gainey et al. | 455/7 |
| 2004/0185794 | A1 * | 9/2004 | Jeong et al. | 455/78 |
| 2004/0192194 | A1 * | 9/2004 | Zhen et al. | 455/11.1 |
| 2004/0219876 | A1 * | 11/2004 | Baker et al. | 455/7 |
| 2004/0235417 | A1 * | 11/2004 | Dean | 455/10 |
| 2004/0247040 | A1 * | 12/2004 | Dennis et al. | 375/295 |
| 2004/0247047 | A1 * | 12/2004 | Dennis et al. | 375/320 |
| 2004/0259497 | A1 * | 12/2004 | Dent | 455/13.3 |
| 2005/0048993 | A1 * | 3/2005 | Ammar et al. | 455/502 |
| 2005/0118949 | A1 * | 6/2005 | Allen et al. | 455/13.4 |
| 2006/0026017 | A1 * | 2/2006 | Walker | 705/1 |
| 2006/0041680 | A1 * | 2/2006 | Proctor, Jr. et al. | 709/238 |
| 2006/0056352 | A1 * | 3/2006 | Proctor et al. | 370/332 |
| 2006/0084379 | A1 * | 4/2006 | O'Neill | 455/25 |
| 2006/0205342 | A1 * | 9/2006 | McKay et al. | 455/11.1 |
| 2006/0240769 | A1 * | 10/2006 | Proctor, Jr. et al. | 455/24 |
| 2007/0010198 | A1 * | 1/2007 | McKay | 455/10 |
| 2007/0066220 | A1 * | 3/2007 | Proctor et al. | 455/11.1 |
| 2007/0211786 | A1 * | 9/2007 | Shattil | 375/141 |
| 2007/0241812 | A1 * | 10/2007 | Yang et al. | 330/75 |
| 2008/0002709 | A1 * | 1/2008 | Kennedy et al. | 370/395.1 |
| 2008/0057880 | A1 * | 3/2008 | Copeland | 455/101 |
| 2008/0265996 | A1 * | 10/2008 | Kim et al. | 330/291 |
| 2008/0293360 | A1 * | 11/2008 | Maslennikov et al. | 455/24 |
| 2009/0086655 | A1 * | 4/2009 | Ghadaksaz | 370/293 |
| 2009/0110033 | A1 * | 4/2009 | Shattil | 375/141 |

* cited by examiner

WIRELESS REPEATER IMPLEMENTING LOW-LEVEL OSCILLATION DETECTION AND PROTECTION FOR A DUPLEX COMMUNICATION SYSTEM

PRIORITY CLAIM TO RELATED APPLICATION

This application claims priority to commonly-owned U.S. Provisional Patent Application Ser. No. 60/574,428 entitled "Wireless Extender and Method For Oscillation Detection For a Frequency Duplex System," filed on May 26, 2004.

TECHNICAL FIELD

The present invention relates to the field of duplex communication systems such as the wireless telephone system, and more particularly to a wireless repeater for improving wireless telephone service within a building, such as a home or office.

BACKGROUND OF THE INVENTION

Wireless telephone systems, which are a type of duplex or two-way communication system, have become widely deployed throughout the United States and abroad. In the United States, most service areas have a number of competing types of wireless communication services for customers to choose from. These include the original analog system or Advanced Mobile Phone System ("AMPS") operating with a carrier frequency in the region of 800 MHz ("Cellular band") as well as digital encoding protocols, such as, Time-Division Multiple Access ("TDMA"), Global System for Mobile communication ("GSM"), and Code-Division Multiple Access ("CDMA"), which operate both in the Cellular band and the Personal Communication System ("PCS") frequency band region of 1900 MHz. Wireless telephone service is also widely available using the European digital systems operating in a carrier frequency band of 900 MHz ("GSM900") or the 1800 MHz Digital Communication System ("DCS") band using GSM encoding (and GPRS/EDGE) and the 2100 MHz Universal Mobile Telephone System ("UMTS") band using CDMA encoding.

All of these wireless telephone systems can suffer from a loss of service in areas where the propagating communication signals are weak due to distance from the Base Transceiver Station ("BTS" or "cell tower") and/or because the signal is blocked by structures or other obstructions. For large buildings and terrestrial features, such as hills and mountains, this problem is addressed by strategic placement of cell towers, which at this point can be seen in a line of site from almost anywhere in the United States. But indoors, where the building blocks the propagating communication signals, it is impractical for the service provider to attempt to solve the problem in all buildings by deploying additional BTSs. For large buildings, it may be practical to locate a dedicated BTS antenna to provide a strong communication signal throughout much of the building, but not for most homes and small offices.

In most homes and small offices, it is not feasible for the users to obtain a dedicated BTS antenna. In this situation, it is not cost effective for the service provider to locate a BTS antenna or increase the transmission power to satisfy individual customers with indoor reception problems. For example, when service is poor in certain locations within the customer premises, such as an office in the basement, there is no practical way to obtain a strong communication signal from a cell tower. As a result, wireless repeaters suitable for receiving, amplifying and retransmitting the wireless communication signal to a specific location, such as an office located in the basement of the customer premises, have been developed and have met with a certain amount of commercial success.

In order to meet the widespread need for improved wireless coverage in homes and small-offices, a wireless repeater must be cost-effective, simple to use, easy to install, and safe for the service provider's network. In order to accomplish these requirements, a wireless repeater must satisfy several challenges. First, the wireless repeater system should be universal to protocol and modulation; therefore, it must be able to handle communications for the AMPS, TDMA, CDMA and GSM systems in a cost-effective manner in the appropriate frequency band (Cellular, PCS, GSM900, DCS, UMTS etc.). Second, the wireless repeater system has to be relatively easy to install by the non-technical customer or professional installation must be widely available at a reasonable cost (typically less than half of the equipment cost). Third, the system must be able prevent interference with the Cellular or PCS network, including positive feedback ("self-oscillations") which develops between the two antennas of the wireless repeater system. This type of self-oscillation, similar to that experienced in audio systems when the microphone is placed too close a speaker, can cause serious problems within the wireless network, including reduced capacity, reduced effective coverage, and loss of service to other licensed users. Also, if not checked, an oscillation within the wireless repeater system can lead to destruction of its circuitry. Fourth, the system should be able to handle communication signals from both relatively near base stations (i.e., relatively strong signals) and relatively far base stations (i.e., relatively weak signals) without creating disruptive interference. Fifth, the system should be able to handle communication signals from both relatively near mobile stations (i.e., relatively strong signals) and relatively far mobile stations (i.e., relatively weak signals) without creating disruptive interference.

Accordingly, there is an ongoing need for a wireless repeater system that is cost-effective for home-based and small office locations. There is a further need for a cost-effective wireless repeater system configured to meet the presently experienced needs for such a system, including the ability to handle the several different types of communication signals that are presently in use, to detect and prevent low-level self-oscillations, to be easy to install or easy to have professionally installed, and to control power transmission from near and far base stations and from near and far mobile stations.

SUMMARY OF THE INVENTION

The present invention meets the needs described above in a modular wireless repeater system that allows a customer to purchase a unit for his or her present type of wireless service, such as Cellular or PCS, and then add on modules for additional types of service that the customer may desire in the future. That is, the wireless repeater may be deployed as a single multi-band module for handling multiple wireless communication frequency bands, or as separate modules for each individual wireless communications frequency band which may be piggy-backed together to meet changing customer needs in a backward compatible manner. Customers generally appreciate this type of configuration flexibility.

Generally described, the invention may be deployed as a wireless repeater to rebroadcast the communication signals which are present outside a building from surrounding BTSs in order to provide improved wireless communications service inside the customer premises. The wireless repeater system includes: 1) a bi-directional amplifier ("BDA" or "Base Unit"), 2) a tower-signal antenna that is typically mounted on the roof or in an attic for best propagation to and from the BTS antenna, 3) a coaxial cable to connect the signal antenna to the Base Unit, and 4) a base unit indoor antenna that is typically located where improved service is desired for best propagation to and from the user's wireless communication device or cellphone. The embodied wireless repeater system can also simultaneously handle two or more types of wireless communications systems presently in use in the United States and be upgraded with a subsequent module in the event that a new frequency is authorized for use in the future. For all of these wireless communications systems, the wireless repeater system detects low-level self-oscillations by discriminating these spurious oscillations from valid communication signals such as pulsed signals, full-duplex analog continuous wave signals, and CDMA signals and prevents these self-oscillations from interfering with the communication networks by reducing the BDA gain or removing power to the amplifiers. The embodied wireless repeater system performs intelligent power control, allowing it to function properly with near and far BTS antennas and mobile stations.

The wireless repeater may also include a proactive isolation management circuit configured to periodically increase the uplink gain of the BDA to attempt to trigger a low-level oscillation, and, thereby, ensure that adequate isolation exists to avoid ultra low-level spurious positive feedback. In these wireless system, the pulsed signals are typically characteristic of TDMA and GSM signals, the full-duplex analog signals are characteristic of AMPS signals, and the continuous wave signals with high-frequency amplitude modulated ("AM") content are characteristic of CDMA signals.

In a particular physical configuration, the wireless repeater includes a base unit having an enclosure that houses the bi-directional amplifier, and which is configured in a location within the customer premises. The wireless repeater also includes a base unit antenna located proximate to, and typically attached to, the enclosure and configured for bi-directional communications with wireless communication terminals, typically telephones, located within the poor reception area. The wireless repeater also includes a tower-signal antenna located at the customer premises remotely from the enclosure, typically in an attic or on the roof, that is configured for bi-directional communications with the wireless BTS. In addition, the wireless repeater includes a communication link, such as a coaxial cable, connecting the tower-signal antenna to the enclosure whereby the tower-signal antenna may be strategically located at the customer premises for communication with the BTS while the base unit antenna may be strategically located within the customer premises for communication with the wireless communication terminals located in the poor reception area.

The base unit of the wireless repeater configured as described above may also include an oscillation detection circuit configured to detect oscillations caused by feedback from the tower-signal antenna to the base unit antenna, and an oscillation protection circuit configured to lower or eliminate a gain setting associated with the bi-directional antenna in response to detected oscillations caused by feedback from the tower-signal antenna to the base unit antenna.

The oscillation detection function includes a pulse detection circuit or algorithm, such as a peak to average circuit, configured to discriminate between a self-oscillation caused by feedback from the tower-signal antenna to the base unit antenna and a pulsed communication characteristic of TDMA and GSM signals. The oscillation detection function may also include a modulation frequency threshold detection circuit, typically set below a frequency characteristic of CDMA signals, configured to discriminate between self-oscillations which do not have much high-frequency AM content and a valid communication signal which does have significant high-frequency AM content.

The oscillation detection circuit may also include a full duplex detection circuit configured to discriminate between oscillations caused by feedback from the tower-signal antenna to the base unit antenna and a full duplex communications characteristic of wireless telephone communication signals. For example, the full duplex detection circuit may typically include a mixing circuit configured to generate and detect the difference frequency between the downlink signal and the uplink signal. This difference signal occurs at a constant frequency for any valid full duplex channel pair and is characteristic of AMPS communication signals and many CDMA communication signals.

In addition, the oscillation detection circuit may include an isolation management circuit configured to periodically increase the uplink gain of the BDA to trigger oscillations caused by feedback from the tower-signal antenna to the base unit antenna in order to maintain the minimum isolation needed and maximize the coverage gain.

More specifically stated, the wireless repeater includes a base unit antenna, a tower-signal antenna, a bi-directional amplifier, and an oscillation detection and protection circuit. The oscillation detection and protection circuit typically includes a pulse detection circuit configured to discriminate between oscillations caused by feedback from the tower-signal antenna to the base unit antenna and pulsed communication signals. The oscillation detection and protection circuit also typically includes a modulation frequency threshold detection circuit configured to discriminate between oscillations caused by feedback from the tower-signal antenna to the base unit antenna and a communication signal comprising a significant component occurring above a modulation frequency threshold not associated with an oscillation. The oscillation detection and protection circuit further includes a full duplex detection circuit configured to discriminate between oscillations caused by feedback from the tower-signal antenna to the base unit antenna and a full duplex communication characteristic of full duplex communication signals. The oscillation detection and protection circuit also typically includes a logic circuit configured to detect oscillations occurring above a threshold level that has been distinguished from a pulsed signal by the pulse detection circuit, distinguished from a full duplex signal by the full duplex detection circuit, and distinguished from communications occurring above a threshold frequency by the modulation frequency threshold detection circuit. The oscillation detection and protection circuit also typically includes a gain reduction circuit to attempt to eliminate the oscillation and a shutdown circuit configured to disconnect power to at least one of the amplifiers in response to an oscillation detected by the logic circuit.

The oscillation detection and protection circuit may also include a continuous wave detection circuit configured to detect a continuous wave signal component. And it may also include a gain management circuit configured to periodically increase the uplink gain of the BDA to trigger the occurrence of oscillations caused by feedback from the tower-signal antenna to the base unit antenna. The pulse detection circuit may include a peak to average circuit, and the pulsed communication signals may be characteristic of TDMA and GSM signals.

In addition, the full duplex detection circuit may include a frequency detection circuit configured to detect signal components having a significant amplitude occurring in downlink and uplink communication channels. The downlink and uplink communication channels may be characteristic of AMPS and CDMA signals.

Further, the full duplex detection circuit may include a mixing circuit configured to combine uplink and downlink signals to create a mixed duplex signal, a filter configured to receive the mixed duplex signal and produce a filtered mixed duplex signal by band-pass filtering the mixed duplex signal, and a power detection circuit configured to determine a power level associated with the filtered mixed duplex signal.

The specific techniques and structures for implementing particular embodiments of the wireless repeater system, and thereby accomplishing the advantages described above, will become apparent from the following detailed description of the embodiments and the appended drawings and claims.

DETAILED DESCRIPTION OF THE EMBODIMENTS

In view of the foregoing, it will be appreciated that the present invention provides significant improvements in wireless repeaters for home and small business use. The modular wireless repeater is typically deployed with a roof-mounted tower-signal antenna and a base unit with a base unit antenna located within the building, with the tower-signal antenna connected to the base unit by a 75Ω coaxial cable. The system allows a customer to purchase a unit for all of the wireless service providers in a given frequency band, such as PCS or Cellular, and then add on modules for additional service providers in other bands that the customer may desire in the future. The system can also be expanded to accommodate new frequency bands and data modulation techniques that may be implemented in the future. For wireless repeaters, this system uniquely uses 75Ω coaxial cable for satellite television and can, therefore, be installed by any satellite television installer. The system also detects and prevents low-level oscillations. The wireless repeater also performs intelligent power control in the downlink allowing it to function properly with near and far BTS antennas and in the uplink allowing it to function properly with near and far mobile users.

The wireless repeater is typically deployed with a roof-mounted tower-signal antenna and a base unit with a base unit antenna located within the building, with the tower-signal antenna connected to the base unit by a 75Ω coaxial cable. However, the tower-signal antenna could be located anywhere that receives acceptable signal power from the wireless BTS antenna, the base unit may be located anywhere that provides acceptable signal power to the area where improved service is desired, and any type of communication link may be employed to connect the tower-signal antenna to the base unit. For example, the communication link could use a different type of cable, a telephone line, the house power wiring, a wireless communication link or any other suitable type of communication technique.

The preferred embodiment of the base unit is shown as analog circuit blocks with a microcontroller, but could be implemented using any suitable type of amplification, power control, and logic circuitry. Of course, the specific circuit configuration is merely illustrative, and could be replaced by any other circuit configuration that implements equivalent functionality. Likewise, the specific control algorithms can be replaced by other control algorithms that implement equivalent functionality.

Figure 1:
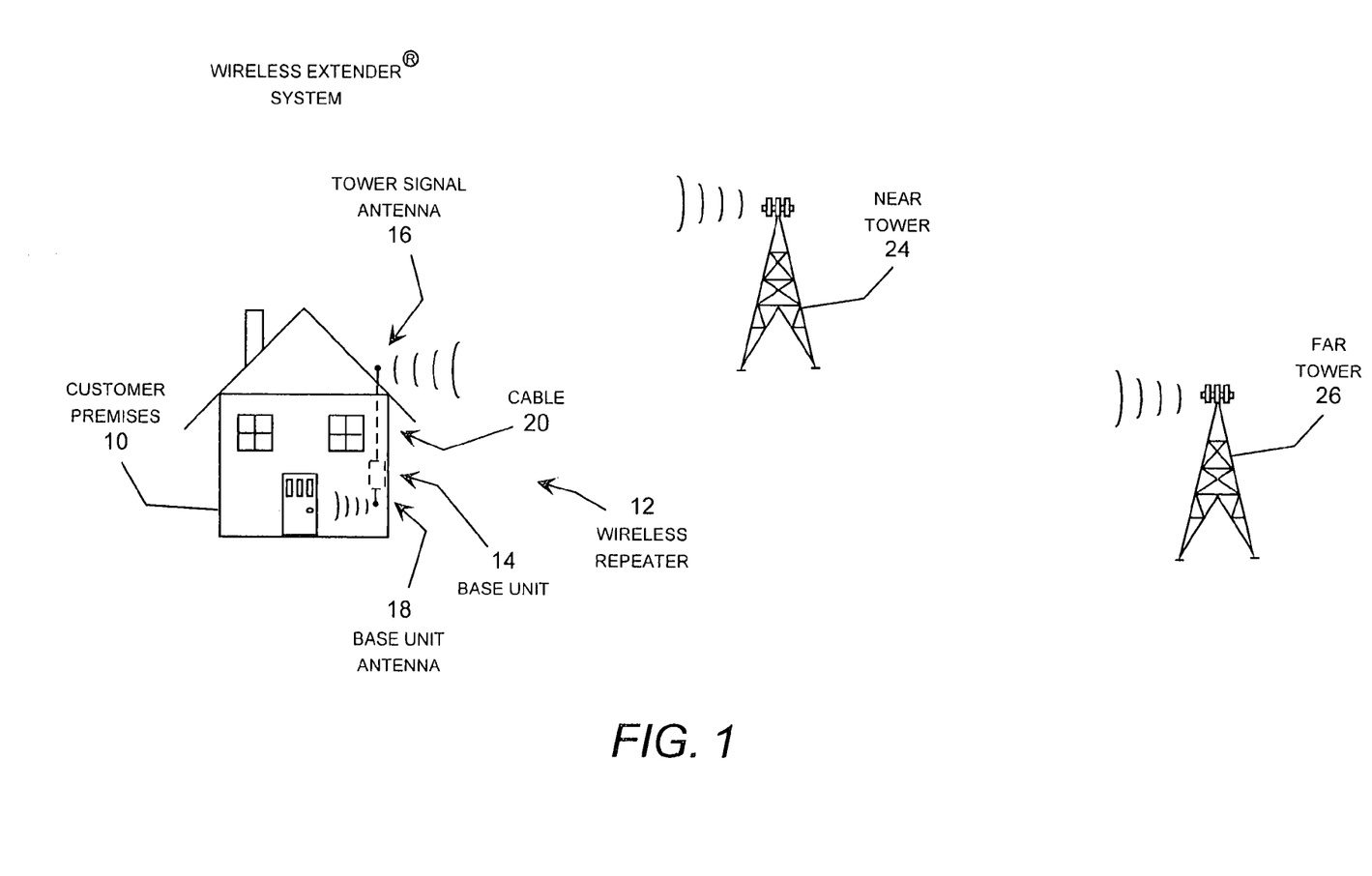
FIG. 1 is a conceptual diagram showing the operating environment for a wireless repeater system.

Turning now to the drawings, in which like numerals refer to like elements throughout the several figures, FIG. 1 is a conceptual diagram showing the operating environment for a wireless repeater system 12 installed to provide improved wireless communication service within a customer premises 10, such as a home or small business. The wireless repeater system 12 includes a base unit 14 with a base unit antenna 18, which is typically located inside the customer premises 10, and a tower-signal antenna 16, which is typically mounted on the roof of the customer premises. The tower-signal antenna 16 is connected to the base unit 14 by a cable 20, typically a readily available 75Ω of the type used for most satellite television systems. As will be explained in more detail later, the wireless repeater system 12 implements intelligent power control so that it can automatically adjust its transmission power to be appropriate for communicating with a near tower 24 and a far tower 26. Of course, the designation "tower" is meant as a generic terms to include any type of base station antenna location, whether it be a stand-alone tower, a multi-function tower, pole, church bell tower, building or any other suitable location. The most common communication signals in the United States are 824-849 MHz for Cellular uplink and 869-894 MHz for Cellular downlink, and 1850-1910 MHz for PCS uplink and 1930-1990 MHz for PCS downlink.

Figure 2:
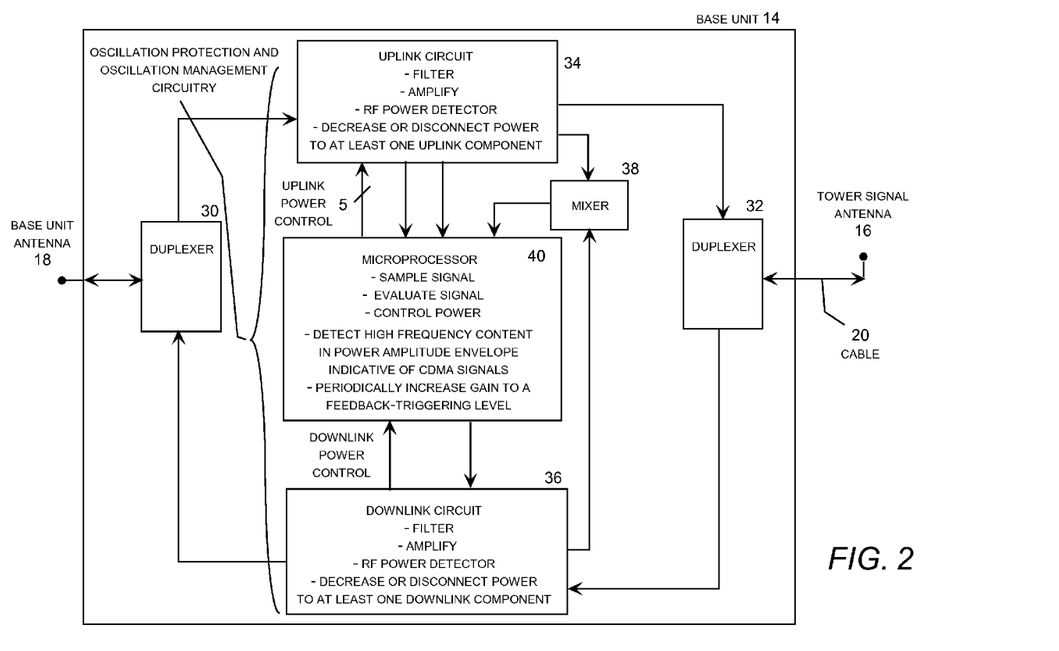
FIG. 2 is a circuit block diagram of the base unit of a wireless repeater system.
Figure 7:
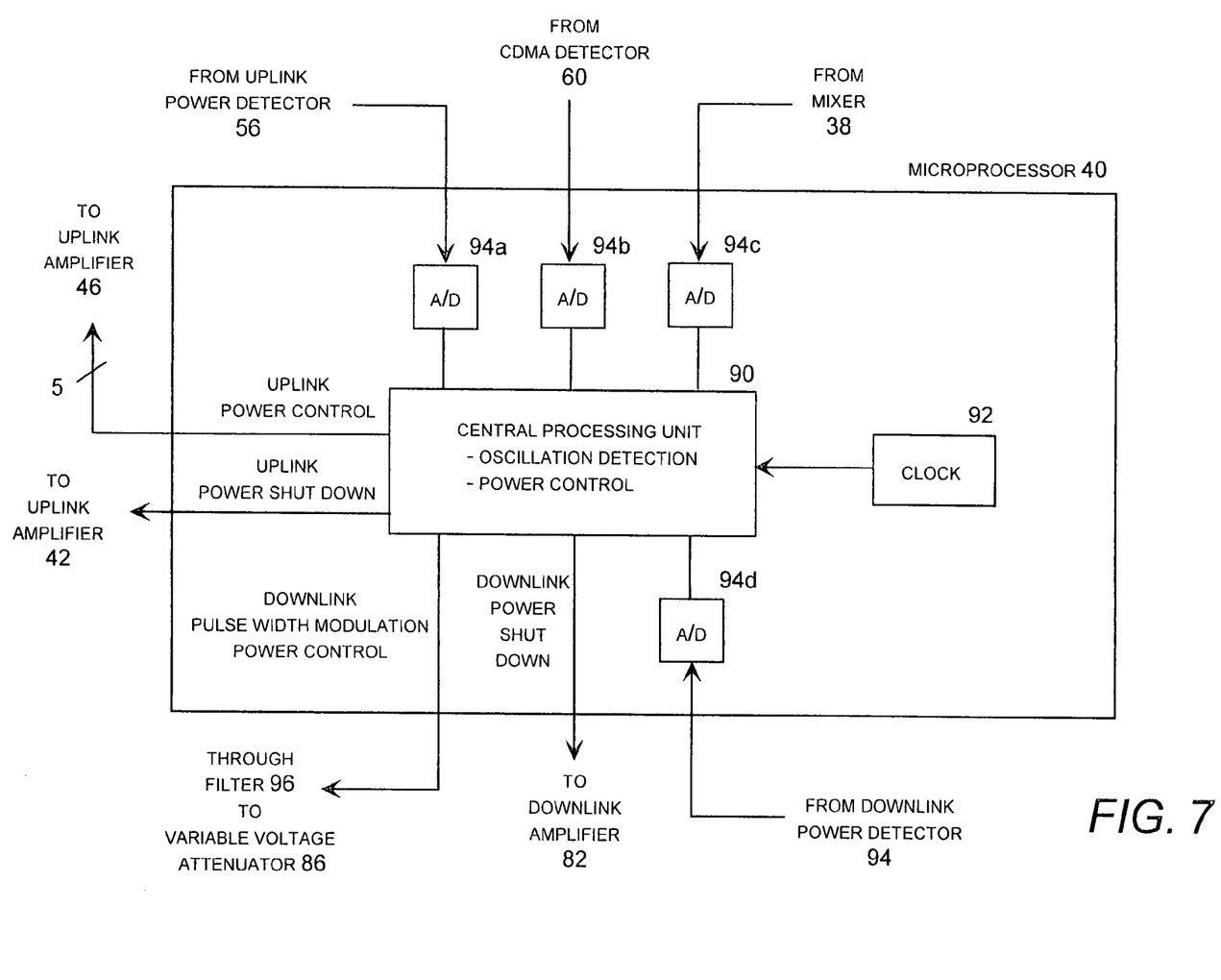
FIG. 7 is a circuit block diagram of a microprocessor circuit in the base unit of FIG. 2.

FIG. 2 is a circuit block diagram of the base unit 14 of wireless repeater system 12. The base unit 14 engages in duplex communications with the tower-signal antenna 16 and the base unit antenna 18. The communication signal from the base unit antenna 18 is delivered to a duplexer 30; which separates uplink and downlink signals. The duplexer 30 delivers a signal to an uplink circuit 34 (FIG. 3) that handles incoming uplink signals by filtering and amplifying the incoming signals received from the duplexer 30. The uplink circuit 34 delivers an output signal to a mixer 38 (FIG. 5), which combines the signal with another signal from the downlink circuit 36 and delivers the mixed signal to the microprocessor 40. The uplink circuit 34 also delivers detected signals to the microprocessor 40 and receives a 5-line uplink power control signal from the microprocessor 40 (FIG. 7). The uplink circuit 34 also delivers its output communication signal to the second duplexer 32.

Simultaneously, the communication tower signal is sent from the tower-signal antenna 16 via the 75Ω cable to the duplexer 32, which separates uplink and downlink signals. The duplexer 32 delivers a signal to a downlink circuit 36 (FIG. 6) that handles incoming downlink signals by filtering and amplifying the downlink signals received from the duplexer 32. The downlink circuit 36 then delivers an output signal to the mixer 38 (FIG. 5), which combines the signal with another signal from the uplink circuit 34. The downlink circuit 36 also delivers a downlink power detection signal to the microprocessor 40 (FIG. 7), and delivers its output communication signal to the duplexer 30.

Figure 3:
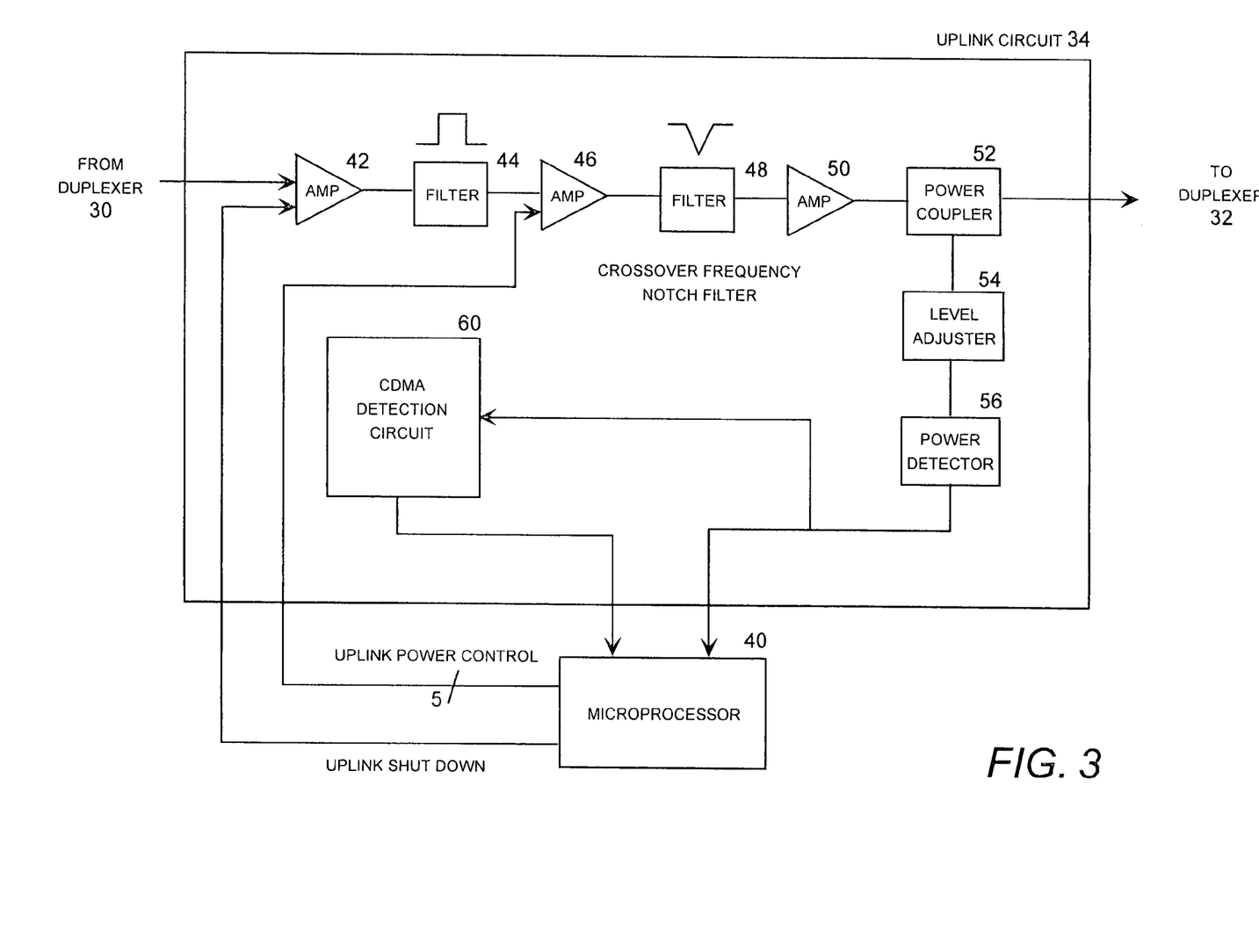
FIG. 3 is a circuit block diagram of an uplink circuit in the base unit of FIG. 2.

FIG. 3 is a circuit block diagram of an uplink circuit 34. The signal received from the duplexer 30 is received and amplified by an input amplifier 42. The input amplifier 42 sends its output signal to a band-pass filter 44, which passes signals about the range of communication signal carrier frequencies used for the applicable communications systems (e.g., Cellular or PCS, GSM900, DCS, etc). The band-pass filter 44 sends its output signal to an uplink power control amplifier (or attenuator) 46, which control the uplink power in response to control signals received from the microprocessor 40. The uplink power control amplifier 46 sends its output signal to a crossover frequency notch filter 48, which ensures adequate isolation between the uplink and downlink amplifiers. The crossover frequency notch filter 48 sends its output signal to a power amplifier 50, which sends its output to a power coupler 52, which sends output power signals to the duplexer 32 and to a level adjuster (e.g. analog attenuator or amplifier) 54. The level adjuster 54 sends its output signal to a power detector 56, which detects the power amplitude envelope in the uplink frequency band. The power detector 56 sends its output signal to the microprocessor 40, which implements the oscillation detection and prevention algorithm along with power control.

The power detector 56 also sends an output signal to a CDMA detection circuit 60, which passes high frequency content signal indicative of CDMA communication signals to the microprocessor 40. The CDMA detection circuit 60 sends its output signal to the microprocessor 40, which implements the oscillation detection and prevention algorithm as noted above. Specifically, the microprocessor 40 may send an uplink power control signal (e.g., 5-line digital control latch signal) to the power control amplifier 46 to trim the power in the uplink circuit. The microprocessor 40 may also send an uplink shut down signal to the input amplifier 42 if the positive feedback oscillation cannot be adequately controlled by the power control amplifier 46.

Figure 4:
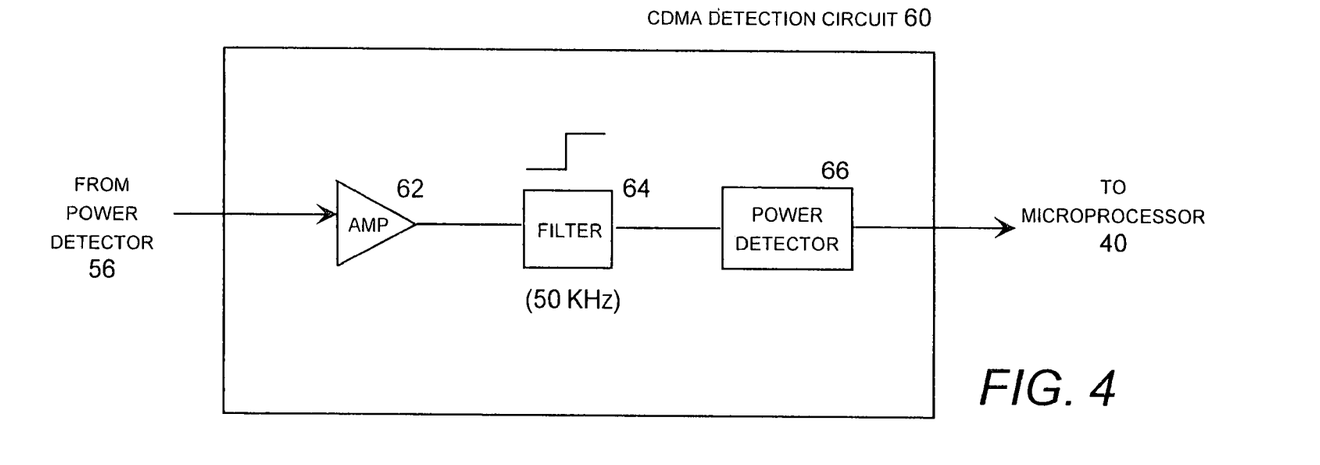
FIG. 4 is a circuit block diagram of a CDMA detection circuit in the base unit of FIG. 2.

FIG. 4 is a circuit block diagram of the CDMA detection circuit 60. The signal from the power amplitude detector 56 is received at an amplifier 62, which amplifies the signal and sends it to a high pass filter 64, which typically passes signals above 50 kHz. The high pass filter 64 sends its output signal to a voltage threshold detector 66, which sends its output signal to the microprocessor 40.

Figure 5:
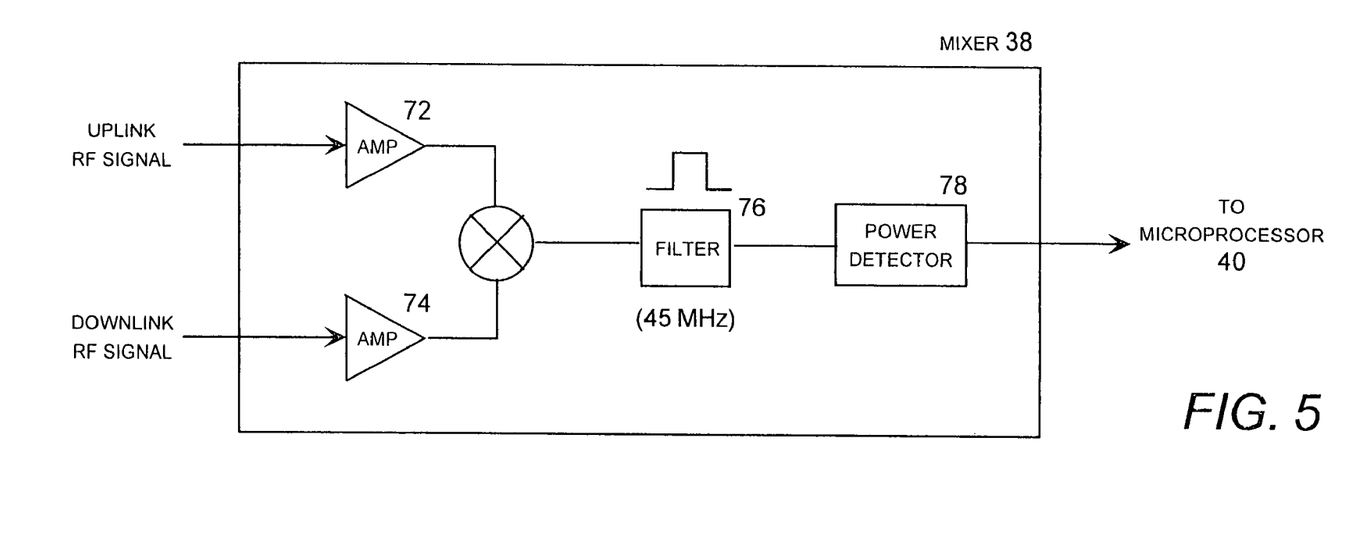
FIG. 5 is a circuit block diagram of a mixer circuit in the base unit of FIG. 2.

FIG. 5 is a circuit block diagram of the mixer circuit 58, which receives input signals from the uplink circuit 34 and the downlink circuit 36. These signals are amplified by amplifiers 72 and 74, respectively, and the resulting signals are combined and sent to a band-pass filter that passes the duplex difference signal (e.g. 45 MHz for the Cellular band) to detect whether the signal is a duplex communication signal or a spurious oscillation signal.

Figure 6:
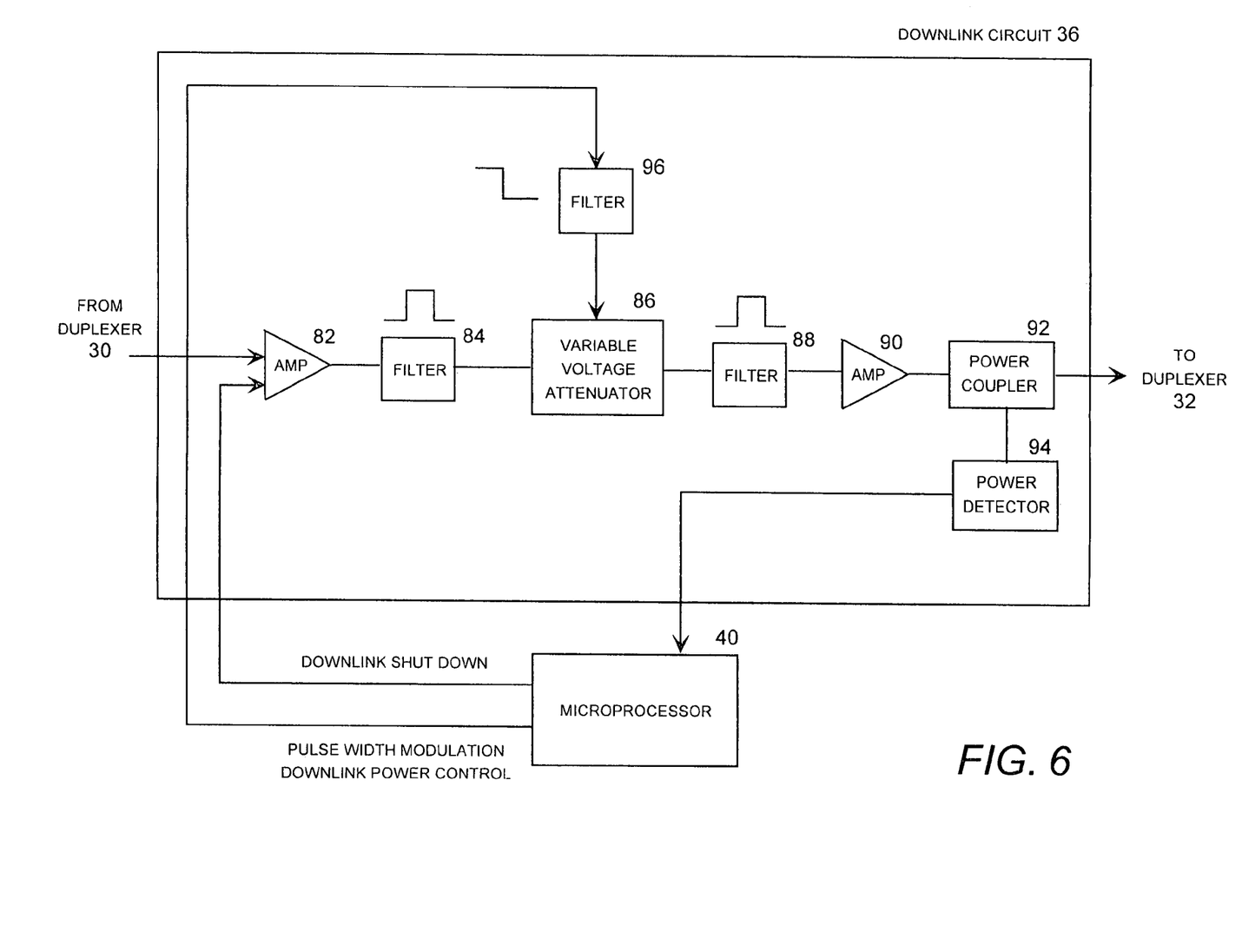
FIG. 6 is a circuit block diagram of a downlink circuit in the base unit of FIG. 2.

FIG. 6 is a circuit block diagram of the downlink circuit 36. The signal received from the duplexer 30 is received and amplified by a downlink amplifier 82. The downlink amplifier 82 sends its output signal to a band-pass filter 84, which passes signals about the range of communication signal carrier frequencies used for the applicable communications systems (e.g., Cellular, PCS, GSM900, DCS, etc.). The band-pass filter 84 sends its output signal to a variable voltage attenuator 86, which controls the downlink power in response to pulse-width modulated control signals received from the microprocessor 40 via a low-pass filter 96. The variable voltage attenuator 86 sends its output signal to band pass filter 88, which passes the carrier frequencies for the applicable communications systems (e.g., Cellular, PCS, GSM900, DCS, etc.). The band pass filter 88 sends its output signal to an output power amplifier 90, and then on to a power coupler 92, which sends output power signals to the duplexer 32 and to a power detector 94, which detects whether an over power condition is present in the downlink signal.

The power detector 94 sends its output signal to the microprocessor 40, which implements the power control algorithm. Specifically, the microprocessor 40 may send a pulse-width modulated downlink power control signal to the variable voltage attenuator 86 via the low-pass filter 96. The microprocessor 40 may also send a downlink shut downlink power control amplifier 82 if the over power condition cannot be adequately controlled by the variable voltage attenuator 86. The specific microprocessor 40 circuit configuration is described in more detail below with reference to FIG. 7.

FIG. 7 is a circuit block diagram of the microprocessor circuit 40. The microprocessor circuit includes a central processing unit (CPU) 92 that operates in accordance with a clock signal from the clock 92. The microprocessor circuit 40 also includes analog-to-digital processing units (A/D) 94*a-d* to convert the analog signals received from the analog circuit components into digital signals for digital processing within the CPU 92. The A/D 92*a* receives an analog signal from the uplink power detector 56 and sends a corresponding digital signal to the CPU 92. The A/D 92*b* receives an analog signal from the CDMA detector 60 and sends a corresponding digital signal to the CPU 92. The A/D 92*c* receives an analog signal from the mixer 38 and sends a corresponding digital signal to the CPU 92. The A/D 92*d* receives an analog signal from the downlink power detector 94 and sends a corresponding digital signal to the CPU 92.

The central processing unit (CPU) 92 sends uplink power control signals to the uplink power control amplifier 46. The central processing unit (CPU) 92 also sends uplink power shut down signals to the uplink power control amplifier 42. The central processing unit (CPU) 92 sends pulse-width modulated downlink power control signals to the variable voltage attenuator 86 via the low-pass filter 96. The central processing unit (CPU) 92 also sends downlink power shut down signals to the downlink power control amplifier 82. The specific microprocessor 40 control algorithm is described in more detail below with reference to FIGS. 8-11.

Figure 8:
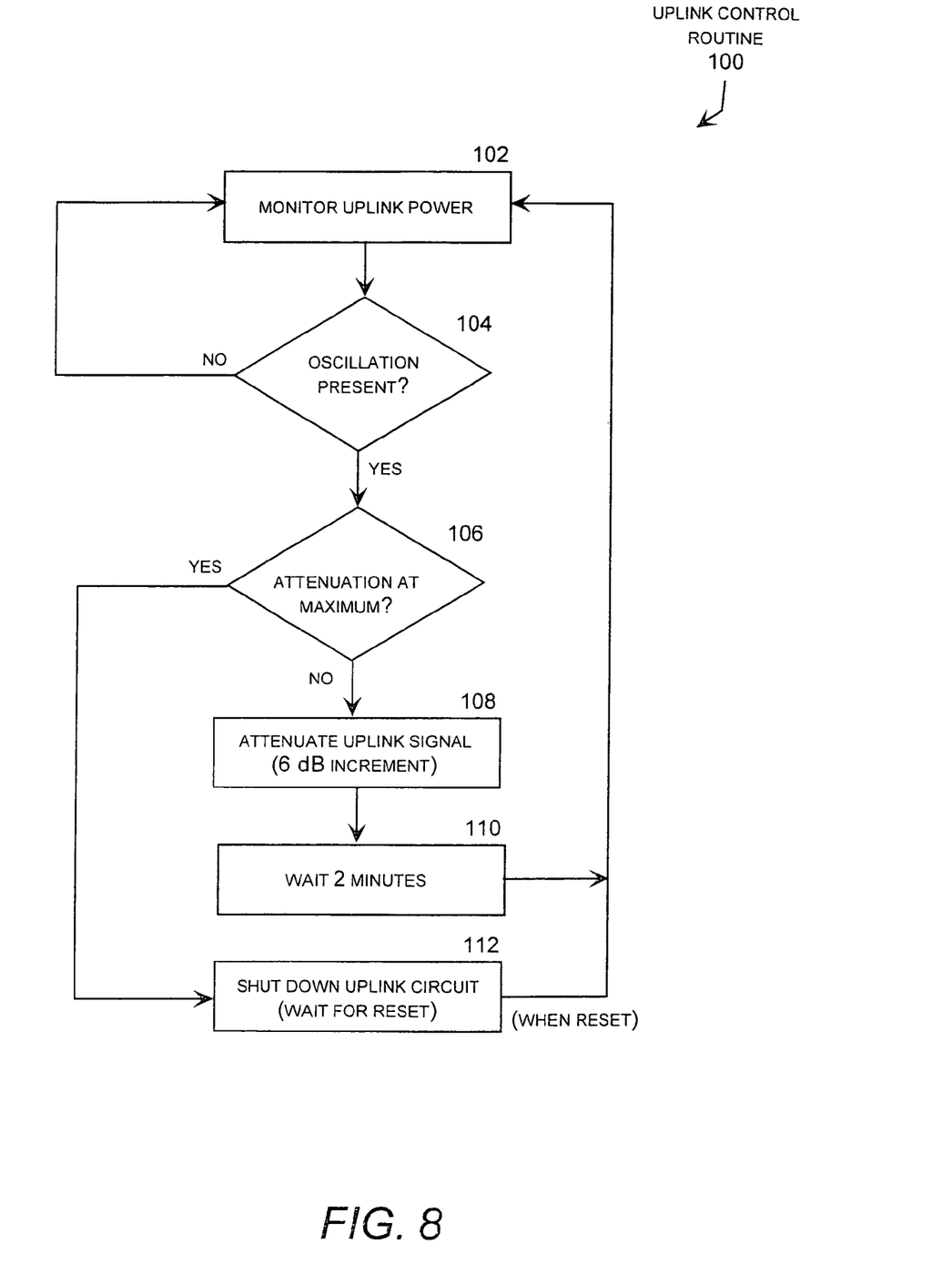
FIG. 8 is a logic flow diagram for uplink control in a wireless repeater system.

FIG. 8 is a logic flow diagram showing Routine 100 for detecting a small or latent oscillation that may be indicative of an impending positive feedback situation. In step 102 (FIG. 9), the microprocessor 40 monitors the uplink signals to detect an oscillation that may be indicative of a positive feedback situation. Step 102 is followed by step 104, in which the microprocessor 40 determines whether an oscillation is present. If an oscillation is not present, the "NO" branch is followed back to step 102, and the microprocessor 40 continues to monitor the uplink power. If an oscillation is present, the "YES" branch is followed to step 106, in which the microprocessor 40 determines whether the uplink attenuation is at its maximum value. If the uplink attenuation is NOT at its maximum value, the "NO" branch is followed to step 108, in which the microprocessor 40 increments the attenuation signal to the uplink power control amplifier 46 (FIG. 3) typically by 6 dB. The microprocessor 40 may loop through this control process several times to implement stepped attenuation, for example using the 5-line latch signal to sequentially increase the attenuation applied by the uplink power control amplifier 46 from zero to 30 dB in 6 dB increments. Step 108 is followed by step 110, in which the microprocessor 40 waits two minutes and then loops back to step 102, and the microprocessor 40 continues to monitor the uplink power. If the uplink attenuation is at its maximum value, the "YES" branch is followed from step 106 to step 112, in which the in which the microprocessor 40 sends a shut down signal to the uplink input filter 42. Routine 200 then loops back to step 102 when the base unit is reset after the installer corrects the antenna isolation (separation).

Figure 9:
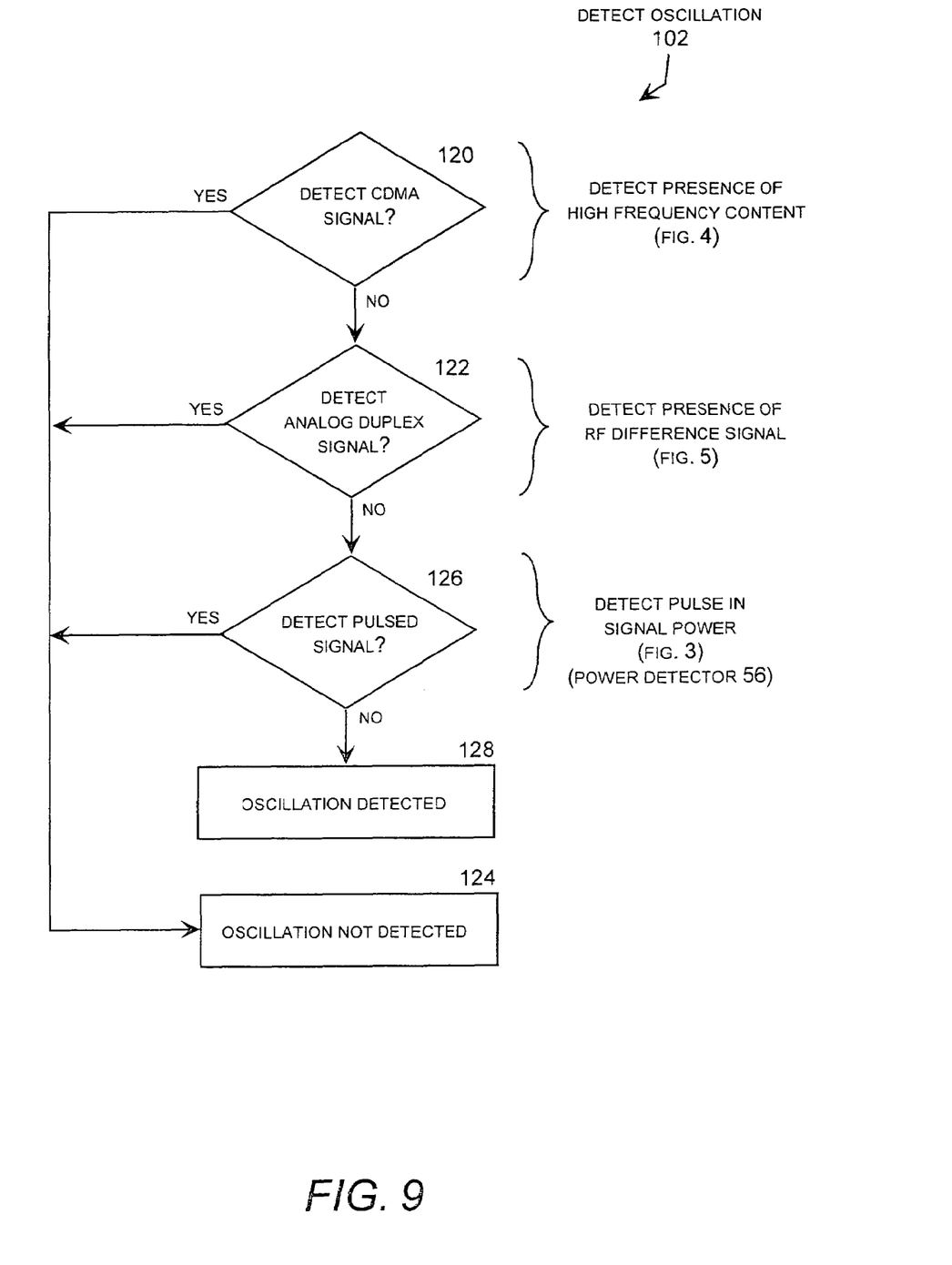
FIG. 9 is a logic flow diagram for oscillation detection in a wireless repeater system.

FIG. 9 is a logic flow diagram for oscillation detection Routine 102 (i.e., step 102 in FIG. 8). In step 120, the microprocessor 40 determines whether a CDMA signal has been detected by determining whether the uplink signal contains a high frequency component indicative of a CDMA signal. See FIG. 4. If a CDMA signal is detected, the microprocessor 40 deems that the uplink signal does not contain a positive feedback oscillation, and the "YES" branch is followed to stop 124 and normal operation continues. If a CDMA signal is NOT detected, then the "NO" is followed from step 120 to step 122, in which the microprocessor 40 determines whether an analog duplex (e.g., AMPS) signal has been detected by determining whether the uplink signal contains a difference signal indicative of analog duplex communications signals. See FIG. 5. If an analog duplex signal is detected, the microprocessor 40 deems that the uplink signal does not contain a positive feedback oscillation, and the "YES" branch is followed to stop 124 and normal operation continues. If an analog duplex signal is NOT detected, then the "NO" is followed from step 122 to step 126, in which the microprocessor 40 determines whether a pulsed signal indicative of TDMA encoded communication signals has been detected by determining if a pulse of predetermined amplitude is present in the uplink signal. See FIG. 3, power detector 56. If a pulsed signal is detected, the microprocessor 40 deems that the uplink signal does not contain a positive feedback oscillation, and the "YES" branch is followed to stop 124 and normal operation continues. If a pulsed signal is NOT detected, then the "NO" is followed from step 122 to step 128, in which the microprocessor 40 deems that a positive feedback oscillation has been detected. In this case, the microprocessor 40 implements uplink (FIG. 8) and downlink (FIG. 10) power control.

Figure 10:
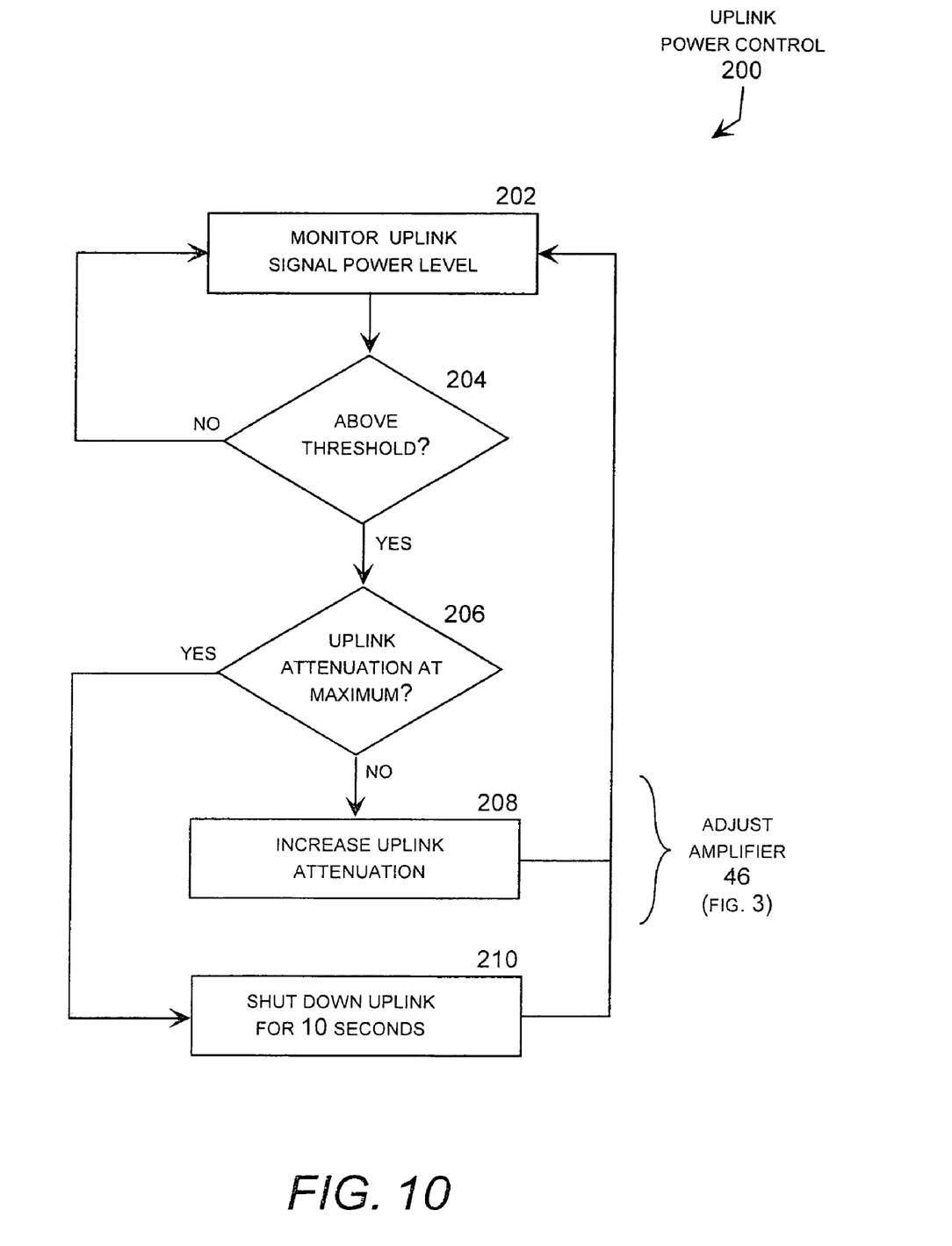
FIG. 10 is a logic flow diagram for uplink power control in a wireless repeater system.

FIG. 10 is a logic flow diagram showing Routine 200 for controlling the uplink power in response to an over power situation (e.g., the mobile user device is too close to the base unit antenna). In step 202, the microprocessor 40 monitors the uplink signals to detect excessive power. Step 202 is followed by step 204, in which the microprocessor 40 determines whether the uplink power is above a predetermined threshold value. If the uplink power is above a predetermined threshold value, the "NO" branch is followed back to step 202, and the microprocessor 40 continues to monitor the uplink power. If an excess power is present, the "YES" branch is followed to step 206, in which the microprocessor 40 determines whether the uplink attenuation is at its maximum value. If the uplink attenuation is NOT at its maximum value, the "NO" branch is followed to step 108, in which the microprocessor 40 increments the attenuation signal to the uplink power control amplifier 46 (FIG. 3), typically by 1 dB. The microprocessor 40 may loop through this control process several times to implement stepped attenuation, for example using the 5-line latch signal to sequentially increase the attenuation applied by the uplink power control amplifier 46 from zero to 30 dB in 1 dB increments. After step 208, the microprocessor 40 loops back to step 202 and the microprocessor 40 continues to monitor the uplink power. If the uplink attenuation is at its maximum value, the "YES" branch is followed from step 206 to step 210, in which the microprocessor 40 sends a shut down signal to the uplink input filter 42. Routine 200 then waits 10 seconds and then loops back to step 202 when the base unit is reset.

Figure 11:
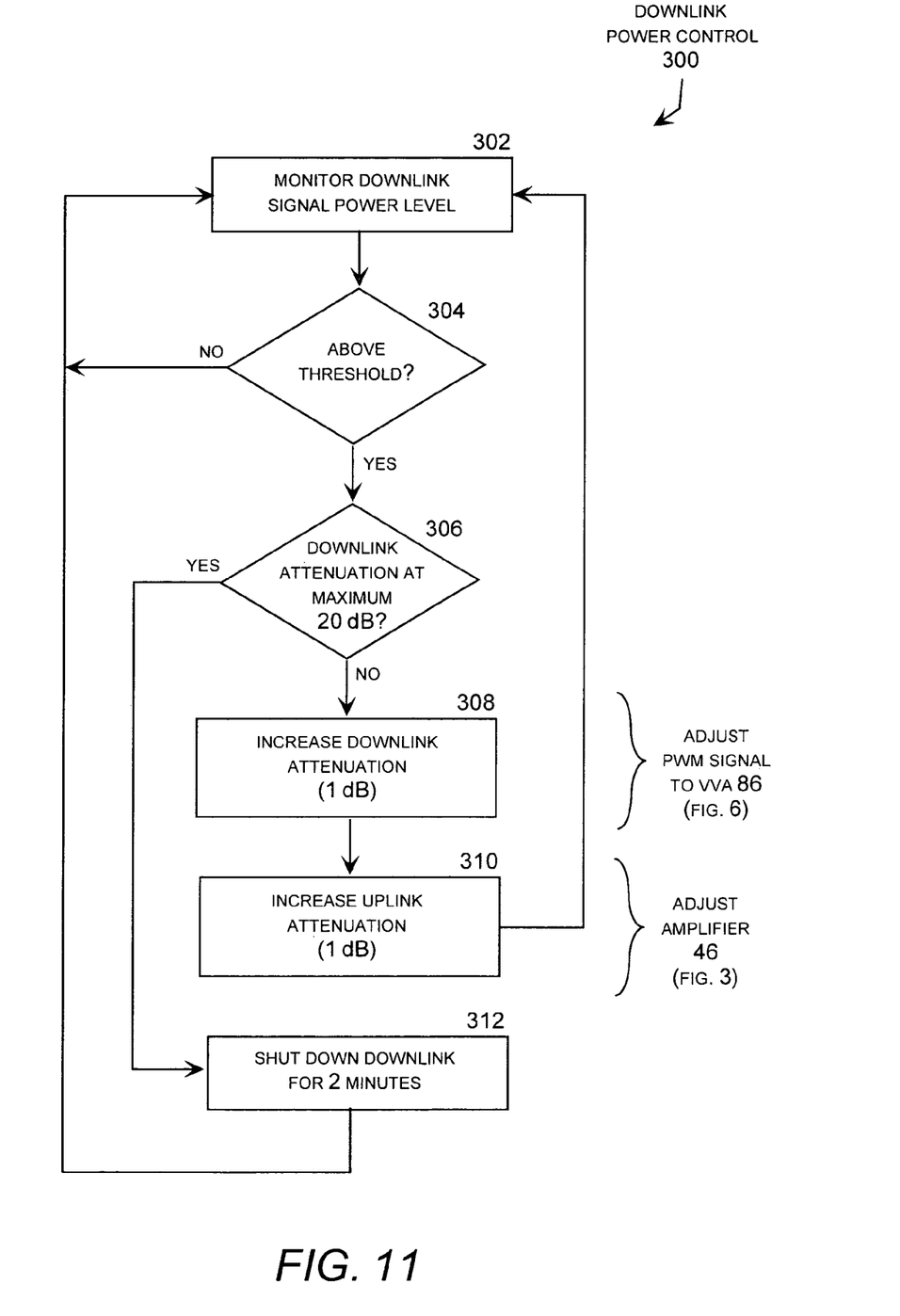
FIG. 11 is a logic flow diagram for downlink power control in a wireless repeater system.

FIG. 11 is a logic flow diagram showing Routine 300 for controlling the downlink power in response to an over power situation. In step 302, the microprocessor 40 monitors the downlink signals to detect excess power that may be indicative of a very near BTS antenna. Step 302 is followed by step 304, in which the microprocessor 40 determines the downlink power is above a predetermined threshold value. If the downlink power is above a predetermined threshold value, the "NO" branch is followed back to step 302, and the microprocessor 40 continues to monitor the downlink power. If excess power is present, the "YES" branch is followed to step 306, in which the microprocessor 40 determines whether the downlink attenuation is at its maximum value. If the downlink attenuation is NOT at its maximum value, the "NO" branch is followed to step 308, in which the microprocessor 40 increments the attenuation signal to the variable voltage attenuator 86 (FIG. 6), typically by 1 dB. Step 308 is followed by step 310, in which the microprocessor 40 also increments the attenuation signal to the uplink power control amplifier 46 (FIG. 3), typically by 1 dB in order to keep the communication link balanced. The microprocessor 40 may loop through this control process several times to implement stepped attenuation, for example using a pulse-width modulation to sequentially increase the attenuation applied by the downlink variable voltage attenuator 86, and using the 5-line latch signal to sequentially increase the attenuation applied by the uplink power control amplifier 46, the step the uplink and downlink attenuation from zero to 20 dB in 1 dB increments. After step 310 the microprocessor 40 loops back to step 302 and the microprocessor 40 continues to monitor the downlink power. If the downlink attenuation is at its maximum value, the "YES" branch is followed from step 306 to step 312, in which the microprocessor 40 sends a shut down signal to the downlink amplifier 42. Routine 300 then waits two minutes and then loops back to step 302 when the base unit is reset.

Figure 12:
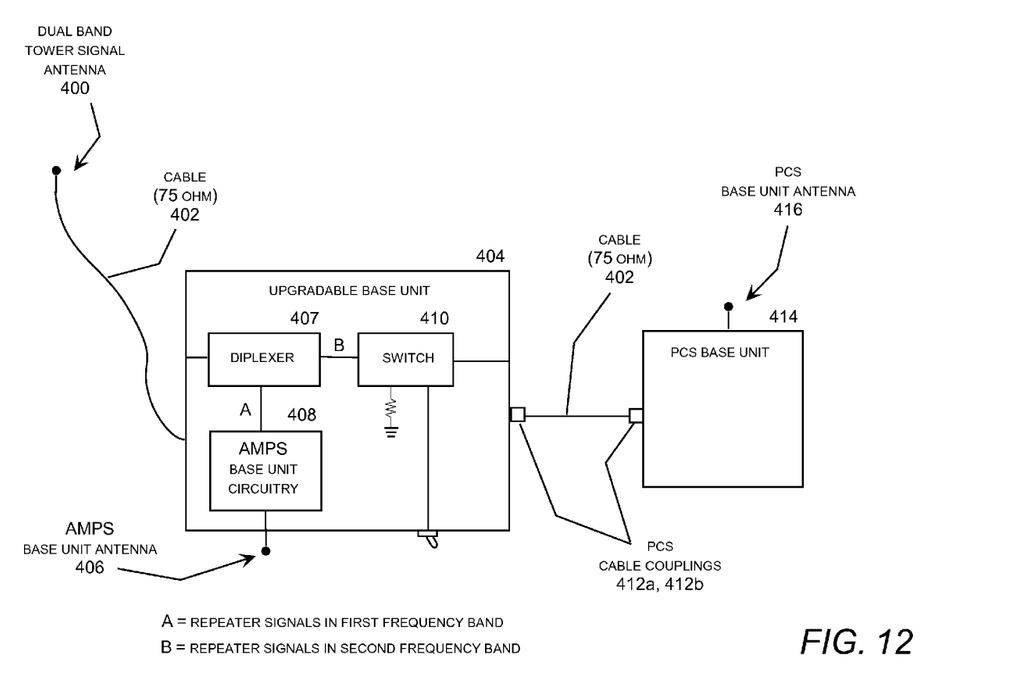
FIG. 12 is a conceptual block diagram of a modular wireless repeater system.

FIG. 12 is a conceptual block diagram of a modular wireless repeater system that includes a dual-band tower-signal antenna 400 connected to an upgradable base unit 404 by way of a 75Ω coaxial cable 402. The upgradable base unit 404, which includes a Cellular system (e.g., 800 MHz) base unit antenna 406, is configured to implement wireless repeater functions for a Cellular band system. The upgradable base unit 404 includes a diplexer 407 to split Cellular signals from PCS signals and a switch 420 to activate pass-through connectivity to an output port for PCS signals. An add-on PCS base unit 414 with a PCS base unit antenna 416 may be connected to the output port of the upgradable base unit 404 to receive the PCS band signals passed through the upgradable base unit. Again, the cables 402 are standard 75Ω coaxial cables, and the ports on the upgradable base unit 404 and the add-on base unit 414 are also standard for 75Ω coaxial cable. Of course, the upgradable base unit 404 could be operative for PCS system signals, or signals for any other wireless communication system. Similarly, the add-on base unit may be operative for Cellular system signals, or signals for any other wireless communication system. In addition, any number of add-on base units may be piggy-backed together to create a modular wireless repeater that may be augmented to meet the customer's needs as they change over time.

It should be understood that the foregoing relates only to the exemplary embodiments of the present invention, and that numerous changes may be made therein without departing from the spirit and scope of the invention as defined by the following claims.

The invention claimed is:

1. A wireless repeater comprising a base unit antenna, a tower-signal antenna, and a bi-directional amplifier configured to send duplex repeater signals between the base unit antenna and the tower-signal antenna, the bi-directional amplifier comprising:
    oscillation detection circuitry configured to detect feedback oscillations occurring in the repeater signals by discriminating the feedback oscillations from valid CDMA communication signals occurring in the repeater signals by detecting a power amplitude envelope occurring in the repeater signals and a high frequency content occurring in the power amplitude envelope indicative of CDMA communication signals; and
    oscillation protection circuitry configured to decrease or disconnect power to at least one component of the bi-directional amplifier in response to the detection of feedback oscillations.

2. The wireless repeater of claim 1, wherein the oscillation detection circuitry is further configured to discriminate feedback oscillations from valid communication signals by distinguishing the repeater signals from characteristics associated with one or more of TDMA, GSM, or AMPS communication signals.

3. The wireless repeater of claim 1, wherein the oscillation detection circuitry is configured to discriminate feedback oscillations from valid communication signals by distinguishing the repeater signals from characteristics associated with TDMA, GSM, AMPS and CDMA communication signals.

4. The wireless repeater of claim 1, wherein the oscillation detection circuitry is configured to discriminate feedback oscillations from valid communication signals by determining whether the repeater signals comprise one or more of pulsed signal characteristics, full duplex signal characteristics, or amplitude modulated signal characteristics.

5. The wireless repeater of claim 1, wherein the oscillation detection circuitry is configured to discriminate feedback oscillations from valid communication signals by distinguishing the repeater signals from pulsed signal characteristics, full duplex signal characteristics, and amplitude modulated signal characteristics.

6. The wireless repeater of claim 1, wherein the oscillation detection circuitry is configured to discriminate feedback oscillations from valid communication signals by determining whether the repeater signals comprise pulsed signal characteristics.

7. The wireless repeater of claim 6, wherein the oscillation detection circuitry is configured to discriminate feedback oscillations from valid communication signals by determining whether the repeater signals comprise pulsed signal characteristics associated with TDMA or GSM communication signals.

8. The wireless repeater of claim 6, wherein the oscillation detection circuitry comprises peak-to-average circuitry configured to determine whether the repeater signals comprise pulsed signal characteristics.

9. The wireless repeater of claim 1, wherein the oscillation detection circuitry is configured to discriminate feedback oscillations from valid communication signals by determining whether the repeater signals comprise full duplex signal characteristics.

10. The wireless repeater of claim 9, wherein the oscillation detection circuitry comprises frequency detection circuitry configured to determine whether the repeater signals comprise full duplex signal characteristics.

11. The wireless repeater of claim 10, wherein the frequency detection circuitry comprises:
    a mixer configured to combine uplink and downlink signals of the bidirectional amplifier to create a mixed duplex signal;
    a filter configured to receive the mixed duplex signal and produce a filtered mixed duplex signal by band-pass filtering the mixed duplex signal; and
    a power detection circuit configured to determine a power level associated with the filtered mixed duplex signal.

12. The wireless repeater claim 11, wherein the oscillation detection circuitry is configured to determine whether the filtered mixed duplex signal comprises characteristics associated with AMPS communication signals.

13. The wireless repeater of claim 10, wherein the frequency detection circuitry is configured to detect the valid CDMA signals by detecting signal components having significant amplitudes occurring in uplink and downlink communication channels associated with CDMA communication signals.

14. The wireless repeater of claim 10, wherein the frequency detection circuitry is configured to detect signal components having significant amplitudes occurring in uplink and downlink communication channels associated with TDMA or GSM communication signals.

15. The wireless repeater of claim 14, wherein the amplitude modulation detection circuitry comprises analog continuous wave detection circuitry.

16. The wireless repeater of claim 1, wherein the oscillation detection circuitry comprises amplitude modulation detection circuitry.

17. The wireless repeater of claim 1, further comprising isolation management circuitry configured to automatically increase a gain setting of the bi-directional amplifier periodically to a feedback-triggering level that triggers initiation of the feedback oscillations; and
    oscillation protection circuitry configured to automatically decrease power to at least one component of the bi-directional amplifier from the feedback-triggering level to initialize the gain at a desired level.

18. A wireless repeater comprising a base unit antenna, a tower-signal antenna, and a bi-directional amplifier configured to send duplex repeater signals between the base unit antenna and the tower-signal antenna, the bi-directional amplifier comprising:
    oscillation detection circuitry configured to detect feedback oscillations occurring in the repeater signals;
    isolation management circuitry configured to automatically increase a gain setting of the bi-directional amplifier periodically to a feedback-triggering level that triggers initiation of the feedback oscillations; and
    oscillation protection circuitry configured to automatically decrease power to at least one component of the bi-directional amplifier from the feedback-triggering level to initialize the gain at a desired level.

19. The wireless repeater of claim 18, wherein the oscillation detection circuitry is configured to discriminate feedback oscillations from valid communication signals by distinguishing the repeater signals from characteristics associated with one or more of TDMA, GSM, or AMPS communication signals.

20. The wireless repeater of claim 18, wherein the oscillation detection circuitry is configured to discriminate feedback oscillations from valid communication signals by distinguishing the repeater signals from characteristics associated with TDMA, GSM, AMPS and CDMA communication signals.

21. The wireless repeater of claim 18, wherein the oscillation detection circuitry is configured to discriminate feedback oscillations from valid communication signals by determining whether the repeater signals comprise one or more of pulsed signal characteristics, full duplex signal characteristics, or amplitude modulated signal characteristics.

22. The wireless repeater of claim 18, wherein the oscillation detection circuitry is configured to discriminate feedback oscillations from valid communication signals by distinguishing the repeater signals from pulsed signal characteristics, full duplex signal characteristics, and amplitude modulated signal characteristics.

23. A wireless repeater system comprising:
a first wireless repeater, comprising a tower-signal antenna, a first base unit antenna, and a first bi-directional amplifier electrically connected between the tower signal antenna and the base unit antenna;
wherein the first bi-directional amplifier is configured to transmit and receive duplex communication signals in a first frequency band via the tower-signal antenna, amplify and deliver downlink communication signals in the first frequency band to the first base unit antenna, receive uplink communication signals in the first frequency band from the first base unit antenna, and amplify and deliver the uplink communication signals in the first frequency band to the tower-signal antenna; and
wherein the first bi-directional amplifier is further configured to transmit and receive duplex communication signals in a second frequency band via the tower-signal antenna, route downlink communication signals in the second frequency band to an output port, receive uplink communication signals in the second frequency band from the output port, and deliver the uplink communication signals in the second frequency band to the tower-signal antenna; and
wherein the first wireless repeater is configured for connection via the output port to a second wireless repeater without a tower signal antenna comprising a second bi-directional amplifier and a second base unit antenna operatively connected to the output port of the first wireless repeater configured to receive the downlink communication signals in the second frequency band from the output port, amplify and deliver the downlink communication signals in the second frequency band to the second base unit antenna, receive uplink communication signals in the second frequency band from the second base unit antenna, and amplify and deliver the uplink communication signals in the second frequency band to the output port.

24. The wireless repeater system of claim 23, further comprising the second bi-directional amplifier removably connected to the first wireless repeater via the output port, configured to receive the downlink communication signals in the second frequency band from the output port, amplify and deliver the downlink communication signals in the second frequency band to a second base unit antenna, receive uplink communication signals in the second frequency band from the second base unit antenna, and amplify and deliver the uplink communication signals in the second frequency band to the first wireless repeater via the output port.

25. The wireless repeater of claim 24, wherein the first and second bi-directional amplifiers further comprise:
oscillation detection circuitry configured to detect feedback oscillations occurring in the repeater signals;
isolation management circuitry configured to periodically increase a gain setting of the bi-directional amplifier to trigger initiation of the feedback oscillations; and
oscillation protection circuitry configured to decrease power to at least one component of the bi-directional amplifier in response to the detection of feedback oscillations.

26. The wireless repeater of claim 24, wherein the first and second bi-directional amplifiers further comprise:
oscillation detection circuitry configured to detect feedback oscillations occurring in the repeater signals by discriminating the feedback oscillations from CDMA communication signals occurring in the repeater signals; and
oscillation protection circuitry configured to decrease or disconnect power to at least one component of the bi-directional amplifier in response to the detection of feedback oscillations.

27. The wireless repeater of claim 26, wherein the oscillation detection circuitry is configured to discriminate feedback oscillations from valid communication signals by distinguishing the repeater signals from characteristics associated with one or more of TDMA, GSM, or AMPS communication signals.

28. The wireless repeater of claim 26, wherein the oscillation detection circuitry is configured to discriminate feedback oscillations from valid communication signals by distinguishing the repeater signals from characteristics associated with TDMA, GSM, AMPS and CDMA communication signals.

29. The wireless repeater of claim 26, wherein the oscillation detection circuitry is configured to discriminate feedback oscillations from valid communication signals by determining whether the repeater signals comprise pulsed signal characteristics, full duplex signal characteristics, or amplitude modulated signal characteristics.

30. The wireless repeater of claim 26, wherein the oscillation detection circuitry is configured to discriminate feedback oscillations from valid communication signals by distinguishing the repeater signals from pulsed signal characteristics, full duplex signal characteristics, and amplitude modulated signal characteristics.

31. A wireless repeater system comprising:
a first wireless repeater comprising a tower signal antenna, a first bidirectional amplifier, a first base unit antenna, a diplexer, and an output port configured to amplify and deliver signals received from the tower signal antenna in a first frequency band to the first base unit antenna, and further configured to deliver signals received from the tower signal antenna in a second frequency band to the output port; and
a second wireless repeater without a tower signal antenna comprising a second bidirectional amplifier and a second base unit antenna operatively connected to the output port and configured to amplify and deliver signals received from the output port in the second frequency band to the second base unit antenna.

32. The wireless repeater system of claim 31, wherein the communication signals in the first frequency band are encoded using a first type of modulation, and the communication signals in the second frequency band are encoded using a second type of modulation.

* * * * *